United States Patent [19]

Scholten

[11] 3,946,294

[45] Mar. 23, 1976

[54] PHOTOCOMPOSER MOTOR SPEED CONTROL

[75] Inventor: Frank L. Scholten, Katonah, N.Y.

[73] Assignee: Addressograph-Multigraph Corporation, Cleveland, Ohio

[22] Filed: July 3, 1974

[21] Appl. No.: 485,342

[52] U.S. Cl. .................. 318/313; 318/318; 354/10; 354/13; 354/16

[51] Int. Cl.$^2$ ............................................ H02P 5/00

[58] Field of Search ........... 318/313, 314, 318, 341; 354/10, 13, 16

[56] References Cited

UNITED STATES PATENTS

| | | | |
|---|---|---|---|
| 3,154,730 | 10/1964 | Houldin et al. | 318/318 X |
| 3,268,788 | 8/1966 | Branco | 318/313 X |
| 3,330,149 | 7/1967 | Scott | 318/313 X |
| 3,590,705 | 7/1971 | Moyroud | 354/15 X |
| 3,820,122 | 6/1974 | Hosterman | 354/15 |
| 3,821,604 | 6/1974 | Walraven | 318/313 X |

*Primary Examiner*—Gene Z. Rubinson
*Attorney, Agent, or Firm*—Ray S. Pyle

[57] ABSTRACT

A system for establishing the speed of an electric motor, particularly a direct current motor. The principal use is in the control of a drive motor for a photocomposition machine font disc. The speed is controlled by spacing pulses of power to the motor. The pulses are derived from a central output of a left shift--right shift register. Shift in one direction is obtained from a uniform clock source, and in the opposed direction from a generator responsive to motor speed. When the motor speed causes the register to shift left beyond the control output, power is cut off and the motor slows. Slowing will allow right shift and a renewal of power pulses.

3 Claims, 3 Drawing Figures

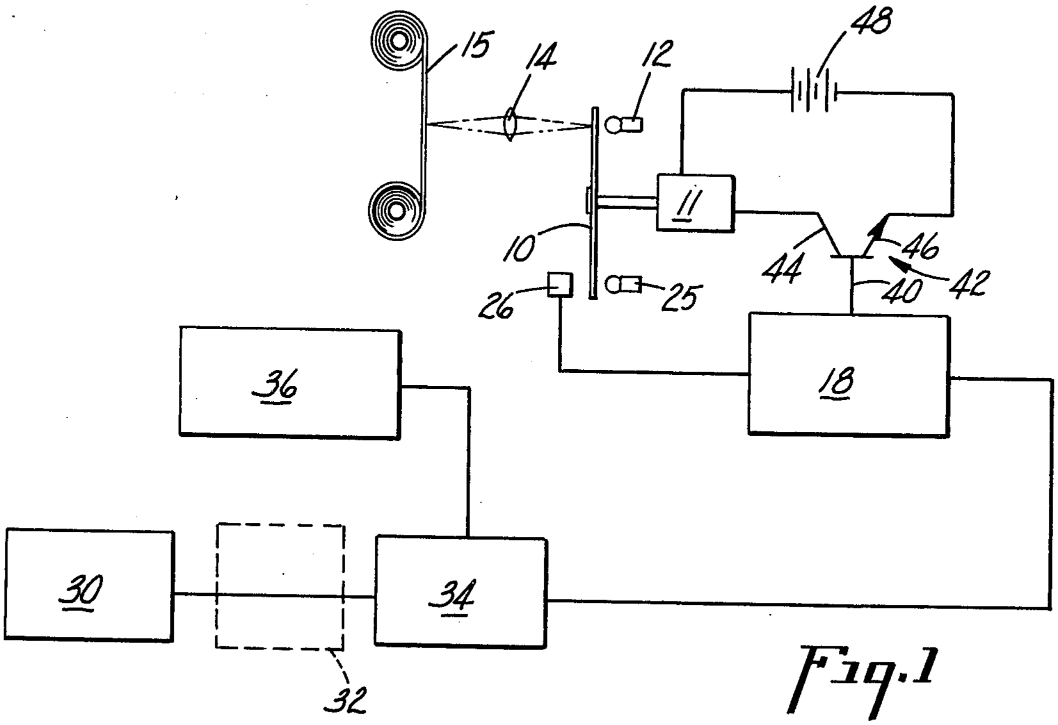
Fig. 1
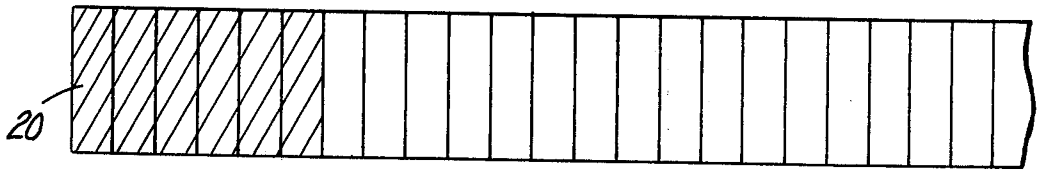
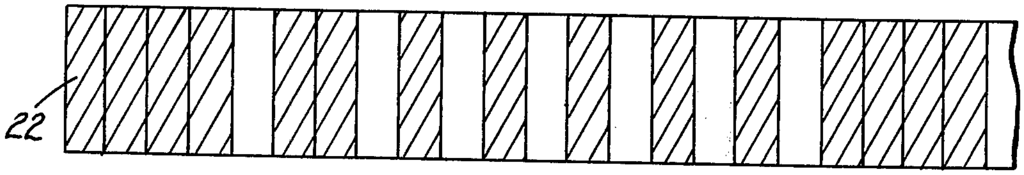
Fig. 3
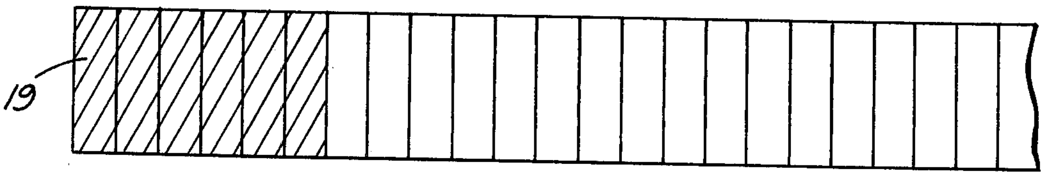

PHOTOCOMPOSER MOTOR SPEED CONTROL

BACKGROUND OF THE INVENTION

Photocomposition of text material has evolved and developed along various avenues, but the most popular and successful forms of photocomposition machines present a rotary font of alphanumeric subject matter in the form of a disc with the characters to be printed represented by transparent areas near the peripheral edge of the disc.

A separate series of alternate transparent and opaque areas provides the source for information to control the logic of the photocomposer in locating a desired character and focuses the image thereof on a plane where a photosensitive sheet is located.

Some photocomposing machines are capable of composing in only a relatively minor variation of size. More sophisticated, later-generation machines are now available which will provide various degrees of enlargement from character transparencies on the same disc. Therefore, it is possible to compose widely varying size images intermixed.

The usual prior art practice is to run the disc continuously but at a speed corresponding to the acceptable speed suitable for projecting the largest character, which is slow in comparison to relatively smaller characters. Another approach is to use a stepper motor and bring each character font to a halt for the required exposure time. The larger characters require a slower speed because the movement of the disc is much more obvious in printed matter of large size. Perfect copy can only be obtained by a disc sitting in a stationary position, but the use of means to bring the disc to a halt slows the process unacceptably for normal commercial composition.

SUMMARY OF THE INVENTION

The problem which is solved by this invention is the control of the motor speed to produce intermixed letters of widely varying sizes in photocomposition, but to avoid complex logic circuitry which might otherwise be required to select and project the proper characters at the proper time whenever the speed of the matrix revolution is constantly changing.

It is an object of the invention to provide a speed control for an electric motor, and particularly for the drive motor of a rotary disc of a photocomposing machine.

DESCRIPTION OF THE DRAWINGS

FIG. 1 is a schematic diagram of the speed control circuitry and essential mechanical structure of a photocomposer machine to illustrate this invention;

DESCRIPTION OF THE PREFERRED EMBODIMENT

Figure 2:
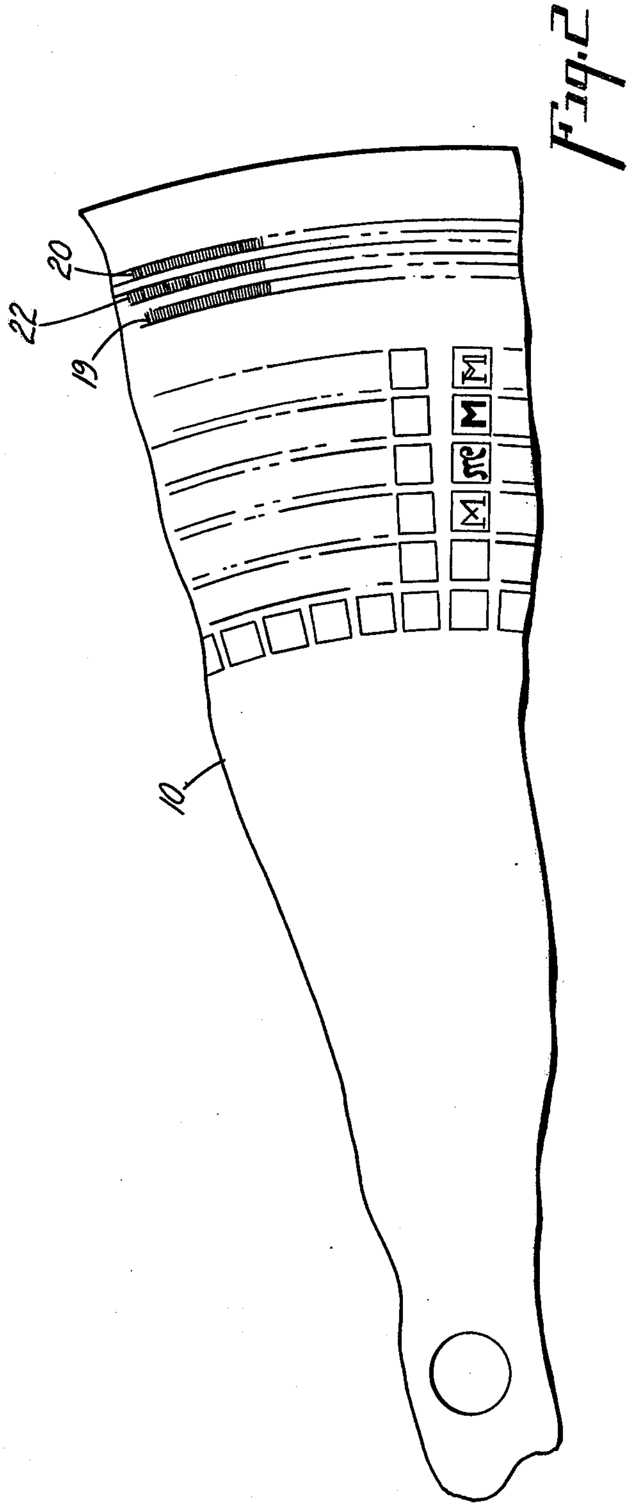
FIG. 2 is a portion of a matrix disc with six font tracks, two data tracks, and one strobe track; and, FIG. 3 is a diagrammatic illustration of a portion of the data and strobe tracks.

In the drawing, FIG. 1 is a schematic diagram of components and their basic relationship needed to carry out the present invention. The components per se are not new, and are commercially available. It is the totality of the arrangement that is represented as being an advance in the art herein.

In the FIG. 1, a disc 10 is driven by a direct current motor 11. A light source 12 projects light through transparent characters in the otherwise opaque disc and the image of the characters is brought to focus by means of an optical system represented by the lens symbol 14. The image in light and shadow of a character on the disc 10 is then brought to focus on a photosensitive sheet 15. Except for a drive motor, an early patent illustrating such rotating disc and composition equipment is shown in U.S. Pat. No. 2,486,406. A more modern version is shown in U.S. Pat. No. 3,590,705 which teaches the availability of multiple font tracks and timing marks on a disc for greater selection of characters and location of those characters during composition.

The control of the motor speed in order to provide the correct disc rotation speed in relationship to the point size of the character being exposed, is accomplished by the provision of a shift register having an intermediate output which is either on or off according to the count that is put into the register from opposite input terminals. Generally, such register is known as a four-bit right shift--left register. Regular pulses are created from a clock source and are used to drive the register in a first mode. Pulses generated by a strobe track on the disc are used to drive the register in a second mode opposed to the first mode. Hence, the register may be brought into balance where it will shift right or left in the vicinity of the output causing the output to be on or off according to the balance of the register. The on or off condition of that output may be used to control a power supply to a direct current motor. The shift register is indicated by the reference character 18 in FIG. 1.

In FIG. 2 that portion of a rotatable matrix disc needed for illustration of the present invention has been reproduced in fragmentary and enlarged size. In keeping with the modern practice of providing more than one font style on a disc, a series of blocks have been drawn representing the position available for six circular tracks of font. The particular font matrix is divided into 112 sectors for the provision of 36 alphanumeric characters and 76 special signs, symbols and punctuation marks. The provision of 112 sectors is not critical, but is a useful number to provide good flexibility of composition in any type style. There are six bands of such characters in the illustrated disc, but often these discs are made with three or four and as high as nine and ten font rows. The more font rows, the greater flexibility, but the greater the expense.

In the context of 112 characters in a font row, there is available 3.214° for the provision of data tracks such as the two data tracks 19 and 20 and the strobe track 22 corresponding to one character row. In the FIG. 2 there is illustrated the position of the data tracks 19 and 20 and strobe track 22 together with the character rows. In FIG. 3 the data tracks 19 and 20 and the strobe track 22 are illustrated in greater detail.

The data tracks 19 and 20 are important for the operation of the total machine, giving information such as the width code for particular characters. However, for illustration of the present invention, concerning regulation of the disc speed according to point size magnification, only the strobe track 22 is of concern. The strobe track contains 18 equal unit spaces for each character position or character row. The illustrated track 22 in both FIGS. 2 and 3 is fragmentary and actually extends completely around the disc periphery.

In FIG. 1 a light source 25 and a sensor 26 are illustrated as a means to sense the light and dark sections of the strobe track 22. In the actual machine similar light and sensing devices are provided for the data tracks 19 and 20.

As the disc rotates, the sensor 26 will register light or the absence thereof and hence put out a digital signal. As the 17th unit space, for example comes into alignment between the light 25 and the sensor 26, the absence of a signal will be detected by the controller. Then, as the 18th unit space comes into alignment between the source 25 and the sensor 26, there will be a transition to a positive signal. The strobe track is not uniform, due to use of the track for other functions of an invention SN 523,630 filed Nov. 14, 1974. Each sector begins with four dark unit spaces followed by a transparent unit, two dark units, and thereafter regular units of equal size. However, because all 112 sectors are the same, the effect of a uniform track is obtained by balancing the first mode clock source frequency against the actual frequency effect of the second mode.

Referring now to the block diagram portion of FIG. 1, a master clock 30 is composed of a crystal pulse generator. Such pulse generators are very commonly used for timing devices such for example as precision instruments. Electric wristwatches are a common example. The crystal in the clock 30 has an output frequency far greater than the frequency needed for the purposes of this invention, and therefore a frequency divider is used to reduce the frequency into a useful range. A dotted outline component 32 is placed in the diagram on FIG. 1 to indicate the use of suitable frequency divider circuitry in the event a high frequency master clock crystal is employed with a range higher than useful. If a master clock of lower frequency is available, then it is not necessary to use a divider 32.

When a proper range frequency is established by means of the clock 30 and possibly a divider 32, that frequency is directed to a counter 34. Counter 34 is programmable by a program register 36. In the context of photocomposition, it is presumed that the programmable register 36 will be employed under the control of the master controller for the photocomposition machine, because it will be necessary to change the counting cycle of the counter 34 according to the dictates of the text being composed.

The control register 36 exerts its control influence upon the counter 34 and will determine the number of pulses which will enter the counter 34 before an output pulse is produced. In this way, the controller of the machine is able to dictate the frequency which is finally divided from the master clock and employed in the speed control of the motor 11.

The output from the counter 34 is applied to an input terminal of a four-bit right--left shift register 18. Accordingly, for each entry pulse, the shift register will shift left one position.

Simultaneously with the production of a controlled frequency through the system described, the strobe track of the disc 10 is caused to produce a series of pulses from the alternately dark and light areas of track 22. These pulses are not totally uniform throughout the 18 units for each character, but the first four units, and the sixth and seventh units constitute a minor part of the entire periphery of the track throughout the 112 sectors, and therefore the imbalance due to these two units in each sector is compensated for.

The output pulses from the strobe track 22 are directed to an input terminal of the register 18 where they are used to shift the register right in opposition to the left shifting caused from the frequency of counter 34.

Between the two opposite input terminals of the register 18, a terminal 40 provides an output which will register on or off according to the momentary condition of the internal flip-flop structure established by the counterbalance of counter 34 and the strobe track 22 frequencies. Terminal 40 is directed through an amplifier to the base of a transistor 42. The collector 44 of the transistor is connected to the coil of direct current motor 11 and the emitter 46 to ground. When the transistor 42 reacts to a signal on the terminal 40, it will become conducting and allow current from a power source 48 to pass through the coil of the motor and cause the motor to begin accelerating. When the shift register shifts right and the terminal 40 goes to zero, the transistor will become an off switch and prevent passage of current to the motor 11 and the motor will begin to decelerate. Thus, the motor will be controllable in speed by a balance between off and on conditions.

As the motor 11 is energized the disc 10 rotates at a greater speed, and conversely the disc 10 is slowed when the motor does not receive power. As the disc 10 increases in speed the frequency from the strobe track sensor 26 will be greater and shift register 18 will tend to shift right against the uniform input of the counter 34. Thus, the output of the shift register will cause motor acceleration until the terminal 40 becomes a digital "0" and then the disc will slow again. Those skilled in the electronic art will understand the phase and frequency balance necessary to use a shift register in this manner. Hence, the shift register 18 is sensitive to the speed of the disc and will increase the speed and decrease the speed of motor 11 by minute bursts of power interspersed by coasting in order to maintain essentially a steady speed.

Also, it should be re-emphasized that the speed that the disc will attain is a direct function of the input frequency to the register 18 and that that input is controlled by the setting of control register 36. A computer program may therefore be written which will indicate to the photocomposer that a large size character is to be composed and therefore that the disc should be slowed for a better exposure. That program will then cause a slowing of the frequency of the output terminal 40 of shift register 18.

The foregoing description of the preferred embodiment has shown how a master clock and a strobe track of a photocomposer may be used to balance one another for the purpose of controlling the speed of the disc, and how that speed may be controlled by a computer program through the establishment of a selected cycle length in a divide counter.

What is claimed is:

1. In a photocomposition machine having a rotatable matrix, a drive motor for said matrix, a size variable projection system to select and project a character from said font in a predetermined point size, and a photosensitive medium positioned to record the projected image of said selected font, the improvement of rotation speed control for said matrix motor coordinated to the point size selected for a character, comprising:

a controller means operable by a program for providing control data for photocomposition control of the machine;

a master clock providing a precision output pulse frequency;

a programmable frequency modifying means supplied by the frequency output of said clock and having an output from said modifying means which is a function of said control data according to a controller supplied number which is changeable at any stage of composition;

a sensor means for producing pulses representative of the speed of said matrix; and a motor speed control means for accepting output from said frequency modifying means and said sensor means to produce a motor speed control function which is phase locked with said output of the frequency modifying means.

2. In a photocomposition machine having a rotatable matrix, a drive motor for said matrix, a size variable projection system to select and project a character from said font in a predetermined point size, and a photosensitive medium positioned to record the projected image of said selected font, the improvement of rotation speed control for said matrix motor coordinated to the point size selected for a character, comprising:

a controller operable by a program for photocomposition control of the machine;

a master clock providing a precision output pulse frequency;

a programmable divider supplied by the output of said clock and having an output which is a subdivision of said clock according to a controller supplied number which is changeable at any stage of composition;

a sensor means for producing pulses representative of the speed of said matrix;

a shift register having a first input from said frequency divider driving said register to shift in a first direction, and a second input from said sensor means driving said register to shift in a second direction, said register having an output which is positioned to toggle to the logic 1 or logic 0 condition by the left or right count condition of said register, and a motor speed control means connected to said output of the register and providing power to said motor when one of the logic conditions is supplied, and no power when the other logic condition is supplied.

3. A photocomposer machine according to claim 2 in which the drive motor is a direct current motor, the provision of a motor speed control being a direct current power source, a transistor gated power line from said source to said motor, and said shift register output being directed to the transistor gate, whereby power is transmitted only when in a selected one of the two logic conditions.

* * * * *